(12) United States Patent
Ashizawa et al.

(10) Patent No.: US 7,926,463 B2
(45) Date of Patent: Apr. 19, 2011

(54) CYLINDER INJECTION TYPE SPARK IGNITION INTERNAL COMBUSTION ENGINE

(75) Inventors: Takeshi Ashizawa, Yokohama (JP); Hiroshi Nomura, Gotenba (JP); Osamu Tomino, Susono (JP); Kaoru Maeda, Yokohama (JP); Keisuke Matsumoto, Yokohama (JP); Takeo Kushida, Yokohama (JP)

(73) Assignees: Toyota Jidosha Kabushiki Kaisha, Toyota-shi (JP); Bosch Corporation, Toyota (JP)

( * ) Notice: Subject to any disclaimer, the term of this patent is extended or adjusted under 35 U.S.C. 154(b) by 481 days.

(21) Appl. No.: 11/915,640

(22) PCT Filed: Jun. 12, 2006

(86) PCT No.: PCT/JP2006/312190
§ 371 (c)(1),
(2), (4) Date: Nov. 27, 2007

(87) PCT Pub. No.: WO2007/000907
PCT Pub. Date: Jan. 4, 2007

(65) Prior Publication Data
US 2009/0194066 A1 Aug. 6, 2009

(30) Foreign Application Priority Data
Jun. 28, 2005 (JP) ................. 2005-188182

(51) Int. Cl.
*F02B 17/00* (2006.01)
*F02B 5/00* (2006.01)
*F02B 19/08* (2006.01)

(52) U.S. Cl. ........ 123/298; 123/295; 123/305; 123/263; 123/276

(58) Field of Classification Search ............... 123/260, 123/298, 299, 301, 302, 305, 262, 263, 276
See application file for complete search history.

(56) References Cited

U.S. PATENT DOCUMENTS

| | | | | |
|---|---|---|---|---|
| 3,318,292 A * | 5/1967 | Hideg | ............... | 123/308 |
| 5,873,344 A * | 2/1999 | Kudou et al. | ............... | 123/295 |
| 5,960,767 A | 10/1999 | Akimoto et al. | | |
| 5,988,137 A | 11/1999 | Tamura et al. | | |
| 6,065,444 A * | 5/2000 | Jingu et al. | ............... | 123/301 |
| 6,138,639 A * | 10/2000 | Hiraya et al. | ............... | 123/295 |
| 6,173,690 B1 * | 1/2001 | Iriya et al. | ............... | 123/295 |
| 6,341,591 B1 * | 1/2002 | Tsutsumi et al. | ............... | 123/295 |
| 6,418,905 B1 | 7/2002 | Baudlot et al. | | |
| 6,634,333 B2 * | 10/2003 | Fujieda et al. | ............... | 123/308 |

(Continued)

FOREIGN PATENT DOCUMENTS

GB     2 310 003 A     8/1997

(Continued)

*Primary Examiner* — Willis R. Wolfe, Jr.
*Assistant Examiner* — Johnny H Hoang
(74) *Attorney, Agent, or Firm* — Oblon, Spivak, McClelland, Maier & Neustadt, L.L.P.

(57) ABSTRACT

An engine provided with a fuel injector for directly injecting fuel into a cylinder, a spark plug positioning a spark gap in a flight path of fuel injected from the fuel injector, and a cavity formed in a piston top face, wherein at the time of stratified combustion, the fuel injector injects substantially all of the fuel in a direction merging with a tumble flow, swirling in a longitudinal direction along the cavity at the compression stroke, along the swirl direction of the tumble flow and uses the spark plug to ignite the fuel while the fuel at the end period of injection is passing through the spark gap.

10 Claims, 2 Drawing Sheets

U.S. PATENT DOCUMENTS

| | | | |
|---|---|---|---|
| 6,672,277 B2 * | 1/2004 | Yasuoka et al. | 123/295 |
| 6,880,519 B2 * | 4/2005 | Nakayama et al. | 123/295 |
| 7,077,099 B2 * | 7/2006 | Fujieda et al. | 123/295 |
| 7,204,225 B2 * | 4/2007 | Kubo et al. | 123/266 |

FOREIGN PATENT DOCUMENTS

| | | |
|---|---|---|
| JP | 9-209762 | 8/1997 |
| JP | 10 131756 | 5/1998 |
| JP | 11-182247 | 7/1999 |
| JP | 2002 227651 | 8/2002 |
| JP | 2004 245204 | 9/2004 |
| JP | 2004 316568 | 11/2004 |
| JP | 2004-340040 | 12/2004 |
| JP | 2004 353594 | 12/2004 |
| JP | 2005-105877 | 4/2005 |
| JP | 2005 155624 | 6/2005 |

* cited by examiner

CYLINDER INJECTION TYPE SPARK IGNITION INTERNAL COMBUSTION ENGINE

TECHNICAL FIELD

The present invention relates to a direct fuel injection-type spark-ignition internal combustion engine.

BACKGROUND ART

Known in the art is stratified combustion using fuel injected in a compression stroke to form a combustible air-fuel mixture in just part of the inside of the cylinder and igniting and burning this combustible air-fuel mixture by a spark plug so as to enable combustion making the air-fuel ratio of the inside of the cylinder as a whole leaner than the stoichiometric air-fuel ratio. At the time of stratified combustion, it is necessary to position the spark gap of the spark plug inside the combustible air-fuel mixture at the ignition timing. For this, it is proposed to bias the injected fuel for forming the combustible air-fuel mixture in the spark plug direction by a cavity formed in the piston top face, but due to this, the fuel injection timing would be limited by the piston position.

To enable the fuel injection timing to be set without such a limitation, there has been proposed a direct fuel injection-type spark-ignition internal combustion engine designed to make the fuel injected from a fuel injector arranged at the approximate center of the top of the cylinder form a combustible air-fuel mixture during its flight inside the cylinder and ignite and burn this combustible air-fuel mixture by a spark plug arranged in the flight path of the injected fuel so as to realize good stratified combustion (for example, see Japanese Patent Publication (A) No. 2005-105877, Japanese Patent Publication (A) No. 9-209762, Japanese Patent Publication (A) No. 11-182247, and Japanese Patent Publication (A) No. 2004-340040).

In the above background art, the fuel injector injects fuel in a hollow conical shape, but even if just injecting fuel in this way, the injected fuel will not form a good combustible air-fuel mixture sufficiently mixed with intake air during its flight before reaching the piston top face or cylinder bore and good stratified combustion can not be realized as designed.

Therefore, an object of the present invention is to provide a direct fuel injection-type spark-ignition internal combustion engine reliably making the fuel injected from the fuel injector a good combustible air-fuel mixture during flight and igniting and burning this combustible air-fuel mixture by a spark plug to enable realization of good stratified combustion.

DISCLOSURE OF THE INVENTION

The direct fuel injection-type spark-ignition internal combustion engine described in claim 1 of the present invention is provided with a fuel injector for directly injecting fuel into a cylinder, a spark plug positioning a spark gap in a flight path of fuel injected from the fuel injector, and a cavity formed in a piston top face, wherein at the time of stratified combustion, the fuel injector injects substantially all of the fuel in a direction merging with a tumble flow, swirling in a longitudinal direction along the cavity at the compression stroke, along the swirl direction of the tumble flow and uses the spark plug to ignite the fuel while the fuel at the end period of injection is passing through the spark gap.

The direct fuel injection-type spark-ignition internal combustion engine described in claim 2 of the present invention provides the direct fuel injection-type spark-ignition internal combustion engine as set forth in claim 1 characterized in that the cavity has a chamfer or a fillet at the inflow side of the tumble flow.

The direct fuel injection-type spark-ignition internal combustion engine described in claim 3 of the present invention provides the direct fuel injection-type spark-ignition internal combustion engine as set forth in claim 1 characterized in that the cavity is biased to the exhaust valve side in the piston top face and in that the tumble flow swirls from the exhaust valve side of the cavity to the intake valve side along the inside wall of the cavity.

The direct fuel injection-type spark-ignition internal combustion engine described in claim 4 of the present invention provides the direct fuel injection-type spark-ignition internal combustion engine as set forth in claim 1 characterized in that the spark plug is provided with a ground electrode of an L-shaped cross-section having a parallel part substantially parallel to an axial line of the spark plug body and a vertical part substantially vertical to the axial line of the spark plug body and is arranged so that the parallel part of the ground electrode is not positioned facing the tumble flow at the downstream side of the tumble flow.

The direct fuel injection-type spark-ignition internal combustion engine described in claim 5 of the present invention provides the direct fuel injection-type spark-ignition internal combustion engine as set forth in claim 1 characterized in that the fuel injector injects substantially all of the fuel toward the inside of the cavity.

The direct fuel injection-type spark-ignition internal combustion engine described in claim 6 of the present invention provides the direct fuel injection-type spark-ignition internal combustion engine as set forth in claim 5 characterized in that the fuel injector injects substantially all of the fuel toward an inside wall of an inflow side of the tumble flow in the cavity.

The direct fuel injection-type spark-ignition internal combustion engine described in claim 7 of the present invention provides the direct fuel injection-type spark-ignition internal combustion engine as set forth in claim 1 characterized in that the fuel injected from the fuel injector has a cross-sectional shape vertical to the center line in the injection direction of an upwardly bulging broken line or curved line shape.

The direct fuel injection-type spark-ignition internal combustion engine described in claim 8 of the present invention provides the direct fuel injection-type spark-ignition internal combustion engine as set forth in claim 1 characterized in that the volume of the cavity is selected so that the air-fuel ratio of the air-fuel mixture formed in the cavity will not become richer than a set air-fuel ratio.

According to the direct fuel injection-type spark-ignition internal combustion engine as set forth in claim 1 of the present invention, at the time of stratified combustion, the fuel injector injects substantially all of the fuel in a direction merging with the tumble flow, swirling in a longitudinal direction along the cavity at the compression stroke, along the swirl direction of the tumble flow, so in particular the fuel injected before the end period of injection is sufficiently mixed with the tumble flow and forms a good combustible air-fuel mixture in the cavity. Due to this, if using a spark plug with a spark gap positioned in the flight path of the injected fuel to ignite the fuel while the fuel at the end period of injection is passing through the spark gap, the combustible air-fuel mixture inside the cavity connected with the fuel at the end period of injection can be reliably ignited and burned and good stratified combustion can be realized.

According to the direct fuel injection-type spark-ignition internal combustion engine as set forth in claim 2 of the present invention, there is provided the direct fuel injection-type spark-ignition internal combustion engine as set forth in claim 1 wherein the cavity has a chamfer or a fillet at the inflow side of the tumble flow, so it is possible to suppress attenuation of the tumble flow formed at the time of the suction stroke and maintain a relatively strong tumble flow even at the timing of fuel injection at the time of stratified combustion, that is, the compression stroke. The mixture of the injected fuel and tumble flow is promoted, so this is advantageous for forming a good combustible air-fuel mixture inside the cavity.

According to the direct fuel injection-type spark-ignition internal combustion engine as set forth in claim 3 of the present invention, there is provided the direct fuel injection-type spark-ignition internal combustion engine as set forth in claim 1 wherein the cavity is biased to the exhaust valve side at the piston top face and the tumble flow is made a forward tumble flow swirling from the exhaust valve side of the cavity along the intake valve side, so compared with a reverse tumble flow with a reverse swirl direction, a strong tumble flow can be formed more easily.

According to the direct fuel injection-type spark-ignition internal combustion engine as set forth in claim 4 of the present invention, there is provided the direct fuel injection-type spark-ignition internal combustion engine as set forth in claim 1 wherein the spark plug is provided with a ground electrode of an L-shaped cross-section having a parallel part substantially parallel to an axial line of the spark plug body and a vertical part substantially vertical to the axial line of the spark plug body and is arranged so that the parallel part of the ground electrode is not positioned facing the tumble flow at the downstream side of the tumble flow, so the arc generated at the spark gap is not obstructed by the parallel part of the ground electrode and can extend to the downstream side together with the tumble flow, the fuel can be ignited right after passing through the spark gap, and the ignitability can be improved.

According to the direct fuel injection-type spark-ignition internal combustion engine as set forth in claim 5 of the present invention, there is provided the direct fuel injection-type spark-ignition internal combustion engine as set forth in claim 1 wherein the fuel injector is designed to inject substantially all of the fuel toward the inside of the cavity. Due to this, it is possible to suppress part of the injected fuel becoming positioned outside the cavity of the piston top face and being exhausted as unburned fuel without contributing to the combustion.

According to the direct fuel injection-type spark-ignition internal combustion engine as set forth in claim 6 of the present invention, there is provided the direct fuel injection-type spark-ignition internal combustion engine as set forth in claim 5 wherein the fuel injector is designed to inject substantially all of the fuel toward the side wall of the inflow side of the tumble flow of the cavity. Due to this, like at the time of low speed operation when the tumble flow formed in the suction stroke is relatively weak and along with this only a weak tumble flow can be maintained in the compression stroke, if the mixture of the injected fuel and tumble flow becomes insufficient, part of the injected fuel will strike the side wall at the inflow side of the cavity, but this impacting fuel will vaporize due to the heat received when proceeding along the inside wall of the cavity and be sufficiently mixed even with the weak tumble flow proceeding along the inside wall of the cavity to enable formation of a good combustible air-fuel mixture inside the cavity.

According to the direct fuel injection-type spark-ignition internal combustion engine as set forth in claim 7 of the present invention, there is provided the direct fuel injection-type spark-ignition internal combustion engine as set forth in claim 1 wherein the fuel injected from the fuel injector has a cross-sectional shape vertical to the center line in the injection direction of an upwardly bulging broken line or curved line shape, so the contact area of the injected fuel and the tumble flow becomes greater and the mixture of the injected fuel and tumble flow becomes good, so even if the spark plug is not that long in length, the air-fuel mixture near the spark plug will not become lean and reliable ignition will be realized.

According to the direct fuel injection-type spark-ignition internal combustion engine as set forth in claim 8 of the present invention, there is provided the direct fuel injection-type spark-ignition internal combustion engine as set forth in claim 1 wherein the volume of the cavity is selected so that the air-fuel ratio of the air-fuel mixture formed in the cavity will not become richer than a set air-fuel ratio, so it is possible to prevent the generation of unburned fuel due to the over rich state.

BEST MODE FOR CARRYING OUT THE INVENTION

Figure 1:
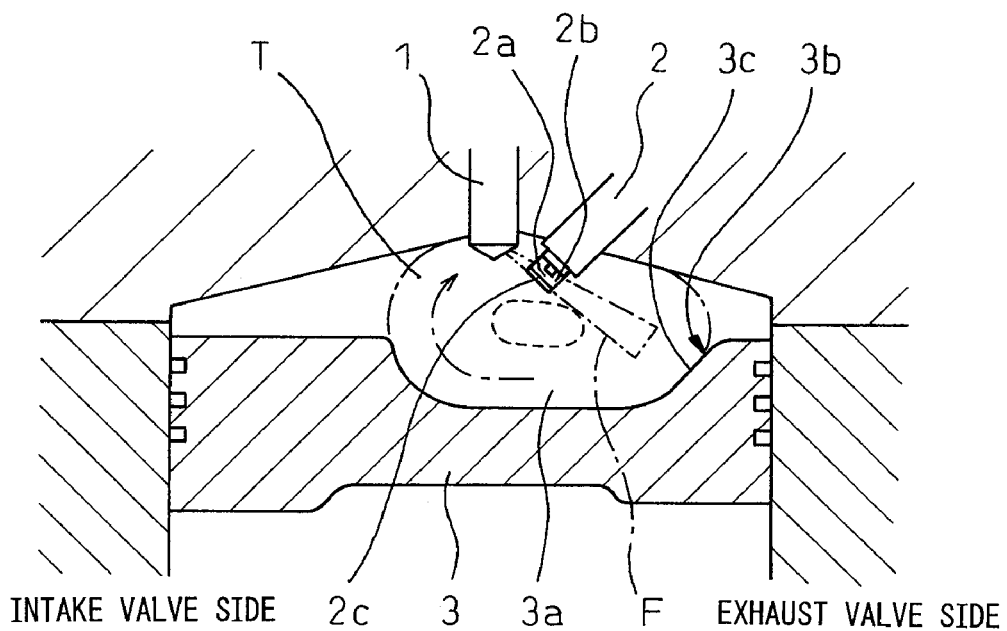
FIG. 1 is a schematic longitudinal cross-sectional view showing an embodiment of a direct fuel injection-type spark-ignition internal combustion engine according to the present invention.

FIG. 1 is a schematic longitudinal cross-sectional view showing an embodiment of a direct fuel injection-type spark-ignition internal combustion engine according to the present invention. In the figure, 1 is a fuel injector arranged at the approximate center of the top of a cylinder for injecting fuel directly into the cylinder, and 2 is a spark plug arranged at the exhaust valve side in the vicinity of the fuel injector 1. This direct fuel injection-type spark-ignition internal combustion engine has two intake valves and two exhaust valves. FIG. 1 is a cross-sectional view passing between the two intake valves and between the two exhaust valves, so the intake valves and exhaust valves are not shown. In FIG. 1, the left side is the intake valve side. The right side is the exhaust valve side.

3 is a piston on whose top face a cavity 3a is formed biased to the exhaust valve side. The cavity 3a has a smooth inside wall suited to guiding the tumble flow. It is for guiding the tumble flow formed inside the cylinder in the suction stroke along the inside wall so as to prevent any major attenuation until the end period of the compression stroke. The intake air sucked in from an intake port (not shown) generally forms a tumble flow which swirls in the cylinder in a manner falling at the exhaust valve side and rising at the intake valve side, so by biasing the cavity 3a to the exhaust valve side of the piston top face, the tumble flow easily swirls along the inside wall of the cavity 3a. This is advantageous for suppressing attenuation of the tumble flow. Further, to enable the tumble flow to easily flow into the cavity 3a, the cavity 3a is provided with a fillet 3b or a chamfer at the inflow side of the tumble flow, that is, the exhaust valve side.

This direct fuel injection-type spark-ignition internal combustion engine, when the engine load is a set value or more, uses the fuel injector 1 to inject fuel in the suction stroke and forms a homogeneous air-fuel mixture inside the cylinder as a whole for homogeneous combustion or injects the fuel during the compression stroke divided into several parts for stratified combustion. On the other hand, when the engine load is less than the set value, it uses the fuel injector 1 to inject fuel at the latter half of the compression stroke for stratified combustion. "Stratified combustion" forms a combustible air-fuel mixture at just part of the inside of the cylinder and ignites and burns this combustible air-fuel mixture. Combustion leaner than the stoichiometric air-fuel ratio becomes possible inside the cylinder as a whole. Further, by relatively increasing the throttle valve opening degree or increasing the amount of exhaust gas recirculation, popping loss is reduced. This is advantageous for reducing the fuel consumption.

The fuel injector of this direct fuel injection-type spark-ignition internal combustion engine is designed to inject substantially all of the fuel F in a direction merging into the tumble flow, swirling in the longitudinal direction along the cavity 3a in the latter half of the compression stroke, along the swirl direction of the tumble flow T. Further, the spark plug 2 is arranged so as to position the spark gap 2a in the flight path of the fuel F injected from the fuel injector in this way.

If igniting the fuel by the spark plug 2 right after the entire amount of fuel determined by the engine load is injected, at the point of time of the ignition, the fuel at the end period of injection will be passing through the spark gap 2a of the spark plug 2 positioned inside the flight path of the injected fuel F, so the fuel at the end period of injection can be reliably ignited. On the other hand, the fuel injected before the end period of injection connected with the fuel of the end period of injection has been present for a short amount of time after merging with the tumble flow along the swirl direction of the tumble flow, so is sufficiently mixed with the tumble flow resulting in a good combustible air-fuel mixture present inside the cavity 3a. The flame of the fuel at the end period of injection is propagated and the fuel is burned well. In this way, good stratified combustion can be realized. To reliably make the flame of the fuel at the end period of injection propagate to the fuel of the initial period of injection, it is preferable to continuously inject fuel from the fuel injector. However, if an extent not obstructing the flame of the fuel at the end period of injection from being propagated to the fuel of the initial period of injection, it is also possible to inject fuel intermittently by providing one or more intervals in the fuel injection. If intervals are provided in the fuel injection in this way, the timing of start of fuel injection is advanced even for injecting the same amount of fuel and the time from the timing of start of fuel injection to ignition becomes longer, so the mixture of the fuel at the initial period of injection and the tumble flow is further promoted and the stratified combustion can be made better.

In the present embodiment, the fuel injected before the end period of injection is merged together with the tumble flow in the cavity 3a of the piston top face as the combustible air-fuel mixture, so will not broadly disperse inside the cylinder and form a lean air-fuel mixture hard to burn. This is advantageous for realization of good stratified combustion. Further, if the cavity 3a is too small in volume, the air-fuel mixture formed inside the cavity 3a becomes richer than the set air-fuel ratio. Due to this over richness, good stratified combustion cannot be realized and a relatively large amount of unburned fuel ends up being produced. Due to this, the volume of the cavity 3a is set, with respect to the maximum amount of fuel injection at the time of stratified combustion, so that the air-fuel ratio of the air-fuel mixture formed inside the cavity 3a by the fuel injected before the end period of injection will not become richer than a set air-fuel ratio.

In this regard, the ground electrode of the spark plug 2 generally has a L-shaped cross-section having a parallel part 2b substantially parallel to the axial line of the spark plug body and a vertical part 2c substantially vertical to the axial line of the spark plug body. When positioning the spark gap 2a of the spark plug 2 inside the flight path of the injected fuel F, the spark plug 2 is preferably arranged so that the parallel part 2b of the ground electrode is not positioned facing the tumble flow at the downstream side of the tumble flow.

Figure 2:
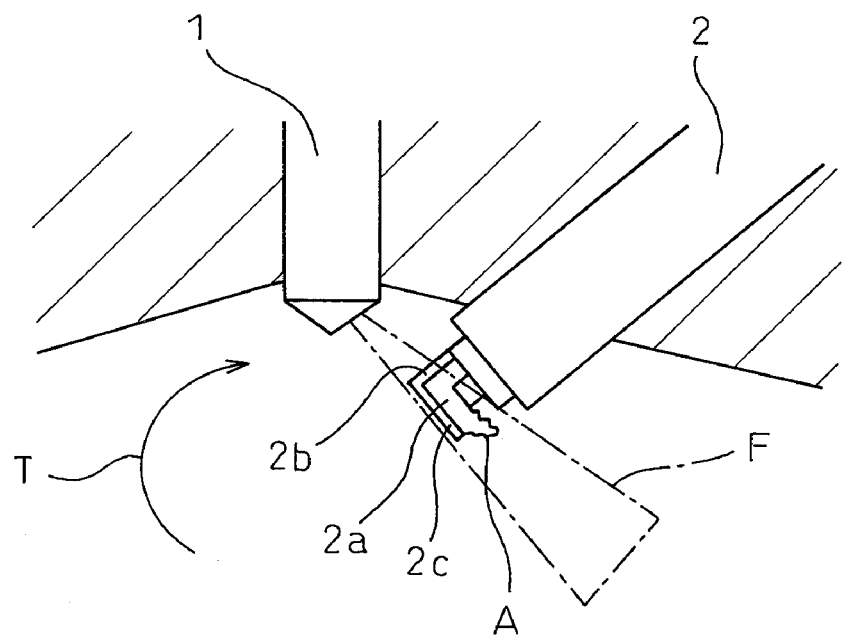
FIG. 2 is an enlarged view of the vicinity of a spark plug in the direct fuel injection-type spark-ignition internal combustion engine of FIG. 1.

FIG. 2 is an enlarged view of the vicinity of a spark plug 2. In FIG. 2, the spark plug 2 is arranged so that the parallel part 2b of the ground electrode is positioned at the upstream side of the tumble flow. Due to this, the arc A generated at the spark gap 2a can extend to the downstream side together with the tumble flow since the downstream side of the tumble flow at the spark gap 2a is not closed by the parallel part 2b of the ground electrode, the fuel F can be ignited right after passing through the spark gap 2a, and the ignitability can be improved.

In FIG. 1, the spark plug 2 is arranged so that the parallel part 2b of the ground electrode becomes parallel with the tumble flow and, further, the vertical part 2c of the ground electrode becomes vertical to the tumble flow. Even with such an arrangement, the downstream side of the tumble flow at the spark gap 2a will not be closed by the parallel part 2b of the ground electrode, so the arc A generated at the spark gap 2a can extend to the downstream side together with the tumble flow and the fuel F right after passing through the spark gap 2a can also be ignited. Further, the injected fuel F passes through the spark gap 2a of the spark plug 2 from the upstream side of the tumble flow T, so if arranging the ground electrode of the spark plug 2 as shown in FIG. 2, the parallel part 2b of the ground electrode positioned at the upstream side of the tumble flow would end up reducing the amount of fuel passing through the spark gap 2a of the spark plug 2. Due to this, the arrangement of the ground electrode of the spark plug 2 in FIG. 1 and the arrangement of the ground electrode rotated 180 degrees about the axial line of the spark plug body are preferable both for extension of the arc A to the downstream side of the tumble flow and the passage through the spark gap 2a of the injected fuel.

Further, the direction of the fuel injection of the fuel injector 1 is made a direction merging with the tumble flow, swirling in the longitudinal direction along the cavity 3a in the latter half of the compression stroke, along the swirl direction of the tumble flow T, but the extension direction of the fuel injection direction is preferably made within the cavity 3a. Due to this, when, like at the time of low speed operation, the tumble flow formed in the suction stroke is relatively weak and along with this only a weak tumble flow is maintained in the compression stroke and the injected fuel cannot be sufficiently directed inside the cavity 3a, since substantially all of the fuel is injected toward the inside of the cavity 3a, it is possible to suppress part of the injected fuel being positioned outside the cavity 3a of the piston top face and being exhausted as unburned fuel without contributing to the combustion.

Further, the direction of extension of the fuel injection direction of the fuel injector 1 is more preferably made the side wall at the inflow side of the tumble flow inside the cavity 3a, in the case of the present embodiment, the side wall 3c at the exhaust valve side of the cavity 3a. By doing this, even when only a weak tumble flow can be maintained at the compression stroke, part of the injected fuel is insufficiently mixed with the tumble flow, strikes the side wall of the exhaust valve side of the cavity 3a due to its own penetrating force, and proceeds in the same direction as the tumble flow along the side wall of the cavity 3a. In this way, this striking fuel is vaporized utilizing the heat of the cavity 3a and is sufficiently mixed even with a weak tumble flow to enable the formation of a combustible air-fuel mixture inside the cavity 3a. In the same way as above, the fuel at the end period of injection can be ignited to realize good stratified combustion.

Figure 3:
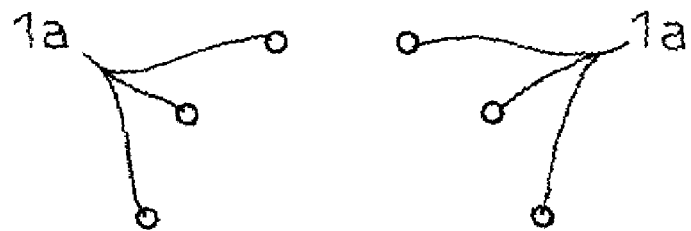
FIG. 3 is a view showing the arrangement of injector holes of a fuel injector.
Figure 4:
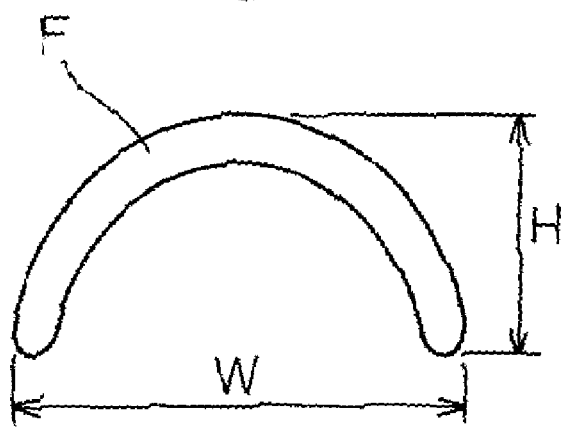
FIG. 4 is a cross-sectional view vertical to the center axis of the injection direction of injected fuel.

However, in the present embodiment, the fuel injector 1 has a plurality of (six) round injector holes 1a arranged in an upwardly bulging arc as shown in FIG. 3 and is designed so that fuel is injected in a columnar shape from each injector hole 1a. The columnar shaped fuel sprays are relatively strong in penetrating force and generate strong frictional force with the intake air (tumble flow) during flight, so are atomized by the frictional force and become combined as a whole. The thus combined fuel spray, as shown in FIG. 4, has a cross-sectional shape vertical to the center axis in the injection direction which is an upwardly bulging curved arc shape.

Figure 5:
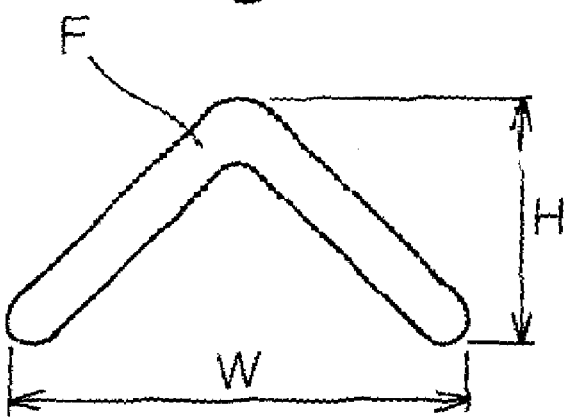
FIG. 5 is another cross-sectional view vertical to the center axis of the injection direction of injected fuel.

The fuel spray F having this curved shape or a cross-section of the broken line shape such as shown in FIG. 5 has a large contact area with the tumble flow, so is easily mixed with the tumble flow. Further, if making the top part of the upwardly bulging curved shape or broken line shape fuel spray pass through the spark gap 2a of the spark plug 2, since the other parts of the fuel spray are positioned below the top part, they will not strike the bottom of the cylinder head. When positioning the spark gap 2a in the flight path of the injected fuel F, it is therefore possible to make the length of the spark plug 2 projected from the bottom of the cylinder head relatively small.

It is possible to realize a similar fuel spray even if using upwardly bulging broken line or curved line slit shaped injector holes instead of the plurality of round injector holes 1a. In the case of a plurality of round injector holes 1a, by making the injector holes 1a face slightly outward and making the overall width W and overall height H of the fuel spray F flare outward, the contact area with the tumble flow further increases and the mixture with the tumble flow can be made better. Of course, even in an outwardly flaring fuel spray F, substantially all of the fuel is injected toward the inside of the cavity 3a, more preferably is injected toward the side wall 3c of the inflow side of the tumble flow of the cavity 3a.

The present embodiment is designed to inject all of the injected fuel F toward the inside of the cavity 3a, preferably toward the exhaust valve side wall 3c of the cavity 3a, but serious problems such as misfires do not occur in the case of the stratified combustion method directing the fuel injected into the cavity to the spark plug direction as a combustible air-fuel mixture, so this is not that absolute. Further, as explained above, the case where it is necessary to inject all of the fuel spray F inside of the cavity 3a or toward the side wall 3c of the exhaust valve side of the cavity 3a is at the time of engine low speed operation where only a weak tumble flow is formed inside the cylinder, so it is also possible to control the fuel injection timing in accordance with the range of piston position just at this time.

In the present embodiment, the tumble flow formed in the cylinder was made a forward tumble flow falling at the exhaust valve side and rising at the intake valve side, but it is also possible to provide a mask wall at the exhaust valve side of the part of the intake port opening into the cylinder etc. so as to form inside the cylinder a reverse tumble flow falling at the intake valve side and rising at the exhaust valve side.

In this case, the cavity of the piston top face is biased toward the intake valve side and the inflow side of the tumble flow of the cavity becomes the intake valve side. Further, the spark plug is arranged at the intake valve side near the fuel injector.

LIST OF REFERENCE NUMERALS

1 . . . fuel injector
2 . . . spark plug
3 . . . piston
3a . . . cavity
T . . . tumble flow
F . . . injected fuel

The invention claimed is:

1. A direct fuel injection-type spark-ignition internal combustion engine comprising:
   a fuel injector which directly injects fuel into a cylinder;
   a spark plug which positions a spark gap in a flight path of fuel injected from said fuel injector; and
   a cavity disposed in a piston top face,
   wherein at the time of stratified combustion, said fuel injector injects substantially all of the fuel in a direction so as to merge with a tumble flow, swirling in a longitudinal direction along said cavity at the compression stroke, along the swirl direction of said tumble flow and said spark plug ignites the fuel being injected at the end period of injection passing through said spark gap.

2. The direct fuel injection-type spark-ignition internal combustion engine as claimed in claim 1, wherein said cavity includes a chamfer or a fillet at an inflow side of said tumble flow.

3. The direct fuel injection-type spark-ignition internal combustion engine as claimed in claim 1, wherein said cavity is biased to an exhaust valve side in the piston top face, and
   wherein said tumble flow swirls from the exhaust valve side of said cavity to an intake valve side along an inside wall of said cavity.

4. The direct fuel injection-type spark-ignition internal combustion engine as claimed in claim 1, wherein said spark plug includes a ground electrode of an L-shaped cross-section, the ground electrode includes a parallel part which extends substantially parallel to an axial line of the spark plug body and a vertical part substantially perpendicular to the axial line of the spark plug body and is arranged so that a first surface of said parallel part is disposed further downstream of said tumble flow than a second surface of said parallel part, said first surface of said parallel part is disposed closer to said spark gap than said second surface of said parallel part.

5. The direct fuel injection-type spark-ignition internal combustion engine as claimed in claim 1, wherein said fuel injector injects substantially all of the fuel toward the inside of said cavity.

6. The direct fuel injection-type spark-ignition internal combustion engine as claimed in claim 5, wherein said fuel injector injects substantially all of the fuel toward an inside wall of an inflow side of said tumble flow in said cavity.

7. The direct fuel injection-type spark-ignition internal combustion engine as claimed in claim 1, wherein the fuel injected from said fuel injector has a cross-sectional shape vertical to the center line in the injection direction of an upwardly bulging broken line or curved line shape.

8. The direct fuel injection-type spark-ignition internal combustion engine as claimed in claim 1, wherein the volume of said cavity is selected so that the air-fuel ratio of the air-fuel mixture formed in said cavity will not become richer than a set air-fuel ratio.

9. The direct fuel injection-type spark-ignition internal combustion engine as claimed in claim 1, wherein substantially all of the fuel injected by the fuel injector passes through the spark gap.

10. The direct fuel injection-type spark-ignition internal combustion engine as claimed in claim 3, wherein said inside wall of said cavity is substantially parallel to said piston top face.

* * * * *